US005341964A

United States Patent [19]

Medved

[11] Patent Number: 5,341,964

[45] Date of Patent: Aug. 30, 1994

[54] CARTRIDGE BIAS ASSEMBLY FOR DISPENSING DEVICE

[75] Inventor: Gary E. Medved, Lyndhurst, Ohio

[73] Assignee: Milbar Corporation, Chagrin Falls, Ohio

[21] Appl. No.: 105,389

[22] Filed: Aug. 12, 1993

[51] Int. Cl.$^5$ .............................................. G01F 11/00

[52] U.S. Cl. .................................. 222/327; 222/391

[58] Field of Search ................................ 222/325-327, 222/386, 389, 390, 391

[56] References Cited

U.S. PATENT DOCUMENTS

| | | | |
|---|---|---|---|
| 2,726,802 | 12/1955 | Jones . | |
| 2,732,102 | 1/1956 | Ekins | 222/327 |
| 2,768,768 | 10/1956 | Cornell et al. | 222/327 X |
| 3,130,872 | 4/1964 | Myers et al. | 222/327 X |
| 3,237,814 | 3/1966 | Collar | 222/327 |
| 3,369,714 | 2/1968 | Dewees et al. | 222/327 |
| 3,381,861 | 5/1968 | Stein . | |
| 3,401,847 | 9/1968 | Downing . | |
| 3,439,839 | 4/1969 | Schumann et al. . | |
| 3,768,472 | 10/1973 | Hodosh et al. . | |
| 3,980,209 | 9/1976 | Collar . | |
| 3,983,947 | 10/1976 | Wills et al. . | |
| 4,081,112 | 3/1978 | Chang . | |
| 4,174,068 | 11/1979 | Rudolph . | |
| 4,376,498 | 3/1983 | Davis, Jr. . | |
| 4,441,629 | 4/1984 | Mackal . | |
| 4,570,832 | 2/1986 | Kroger . | |
| 4,653,673 | 3/1987 | Wagner . | |
| 4,826,050 | 5/1989 | Murphy et al. . | |
| 4,925,061 | 5/1990 | Jeromson, Jr. et al. . | |
| 4,966,317 | 10/1990 | Barr . | |
| 5,181,636 | 1/1993 | Anderson et al. . | |

FOREIGN PATENT DOCUMENTS

| | | | |
|---|---|---|---|
| 8909425 | 11/1989 | Fed. Rep. of Germany . |
| 2424856 | 11/1979 | France . |

OTHER PUBLICATIONS

Vital Products, Inc. Specification Sheet, Model AA-Air-Lite.

Vital Products, Inc. Specification Sheet, Model DAC-Air-Lite, Jr.

Kenmar Specification, Model No. 75A.

*Primary Examiner*—Kevin P. Shaver

*Attorney, Agent, or Firm*—Calfee, Halter & Griswold

[57] ABSTRACT

A dispensing device includes a frame designed to receive and support a cartridge containing a viscous product. The dispensing device has a plunger with a plunger shaft and plate for dispensing the viscous product from the cartridge, and a drive assembly with a handle and a trigger for advancing the plunger. The frame of the dispensing device has a front yoke to receive and align the nozzle at one end of the cartridge, and sidewalls defining an aperture designed to receive the cartridge and support the body of the cartridge. A cartridge biasing assembly integral with the frame biases the cartridge toward the front yoke of the frame. The cartridge biasing assembly includes a biasing plate and a spring at least partially surrounded by a shroud. The cartridge is received within an entrance opening in the shroud and is spring-biased forwardly in the dispensing device by the biasing plate to prevent the cartridge from becoming misaligned.

11 Claims, 3 Drawing Sheets

CARTRIDGE BIAS ASSEMBLY FOR DISPENSING DEVICE

FIELD OF THE INVENTION

The present invention relates generally to dispensing devices for viscous material, and more particularly to caulking guns for caulk, butyl rubber, silicone, latex, mortar seal, roof cement or other such adhesives or sealants.

BACKGROUND OF THE INVENTION

Dispensing devices such as caulking guns are well known for dispensing viscous material. The dispensing devices can either be fully enclosed, where the viscous material is loaded into a sealed container; or the dispensing device can have an opening designed to receive a "drop-in" cartridge. The drop-in type dispensing devices typically include a pistol-grip handle with connection at the forward end to a conventional frame structure including a butt cup, a hemispherical cylinder extending forwardly from the butt cup, and a yoke at the distal end of the cylinder. A plunger shank or shaft passes horizontally through the upper portion of the handle and has at its rear end a substantially right-angle bend, and at its forward end a piston plate for urging the viscous material from a conventional cylindrical cartridge held between the butt cup and the yoke in the hemispherical cylinder. Such a drop-in type dispensing device is shown in Chang, U.S. Pat. No. 4,081,112.

Various techniques have been developed to drive the plunger shaft forwardly within the hemispherical cylinder to dispense the viscous material. The most commonly known technique is to have a trigger driving a spring-biased washer off-center against the plunger shaft to grab and advance the shaft. The trigger engages the bottom portion of the washer during each manual stroke of the trigger. An improvement of this technique is shown in Chang, U.S. Pat. No. 4,081,112, whereby the trigger engages the upper portion of the washer during each manual stroke. Another improved technique is shown in Davis, Jr., U.S. Pat. No. 4,376,498, which uses compressed air to drive the plunger shaft forward. An even more recent technique is shown in Anderson, et al., U.S. Pat. No. 5,181,636, which is owned by the assignee of the present invention, wherein compressed air or $CO_2$ is used to drive a washer off-center to grab and advance the plunger shaft.

After the plunger shaft has been driven forwardly to dispense a sufficient amount of viscous material, or when the cartridge is depleted, a release trigger can be manipulated to allow the plunger shaft to be moved in a reverse direction.

The above discussion tends to show that, while a certain amount of development has been directed toward the means for driving the plunger shaft forward to dispense the viscous material, little innovation has occurred in the hemispherical cylinder supporting the cylindrical cartridge.

It has been applicants' experience that particularly with the development of compressed air-driven and $CO_2$-driven caulking guns, the plunger piston in the dispensing device is being driven forward within the cartridge with considerable force. It is also applicants' experience that under some situations, the cartridge can become misaligned or askew within the hemispherical cylinder. For example, the cartridge can become misaligned if the piston within the cartridge tilts while dispensing a low viscosity material and the plunger piston raises the rear end of the cartridge from its seat within the cylinder; or when pressure is applied to the nozzle of the cartridge during dispensing of the material (e.g., the nozzle is forced into a wall joint to apply caulk—which thereby moves the cartridge rearwardly within the caulking gun and offsets the front end of the cartridge from the yoke).

If the cartridge is somehow askew or misaligned within the dispensing device, the caulking cartridge can exert a concentrated load against the front yoke or on support structure on the device and damage the dispensing device when the trigger piston advances. Applicants' have determined that this may be due to the front end of the cartridge becoming misaligned with or dislodged from the front yoke of the device such that when the plunger piston advances against the cartridge piston, the front cap on the cartridge is driven at an angle against the yoke, or into the surrounding structure on the device—for example the peripheral flange on the front yoke.

Hence, applicants have determined that there is a demand in the industry for a dispensing device which prevents misalignment of a cartridge when the viscous product is being dispensed.

SUMMARY

The present invention provides a new and useful dispensing device which maintains a cartridge in proper alignment within the device for dispensing a viscous product.

The dispensing device comprises a pistol-grip handle with a connection at the forward end to frame structure which includes a butt cup, a forwardly-extending hemispherical cylinder open along the top, and a yoke at the distal end of the cylinder. A plunger shank or plunger shaft passes horizontally through the upper portion of the handle, and has at its rear end a substantially right-angle bend, and at its forward end a piston plate for urging caulking compound from a conventional cylindrical container held between the butt cup and the yoke in the hemispherical cylinder.

A cartridge biasing assembly is mounted to the hemispherical cylinder adjacent the butt cup at the rear end of the hemispherical cylinder. The cartridge biasing assembly includes an outer shroud partially enclosing a biasing plate and a spring. The spring normally surrounds the plunger shaft and urges the biasing plate forward within the hemispherical cylinder.

When the caulking cartridge is inserted into the dispensing device, the rear end of the caulking cartridge is inserted into the entrance opening of the shroud. A flange on the biasing plate extends outwardly to surround a portion of the rear end of the cartridge. The nozzle on the front end of the caulking cartridge is then located appropriately within the yoke of the dispensing device, and the biasing plate of the cartridge biasing assembly urges the cartridge forward against the front yoke. The cartridge biasing assembly prevents the rear end of the cartridge from raising up and prevents the cartridge from moving rearwardly during dispensing of the viscous product, such as when pressure is applied to the nozzle.

It is therefore one feature of the present invention to provide a dispensing device for a cartridge containing a viscous product, wherein the dispensing device normally urges the cartridge forwardly within the device to prevent the cartridge from becoming misaligned.

Further features of the present invention will become apparent from the following detailed description and accompanying drawings which form a part of the specification.

DETAILED DESCRIPTION OF THE PREFERRED EMBODIMENT

Figure 1:
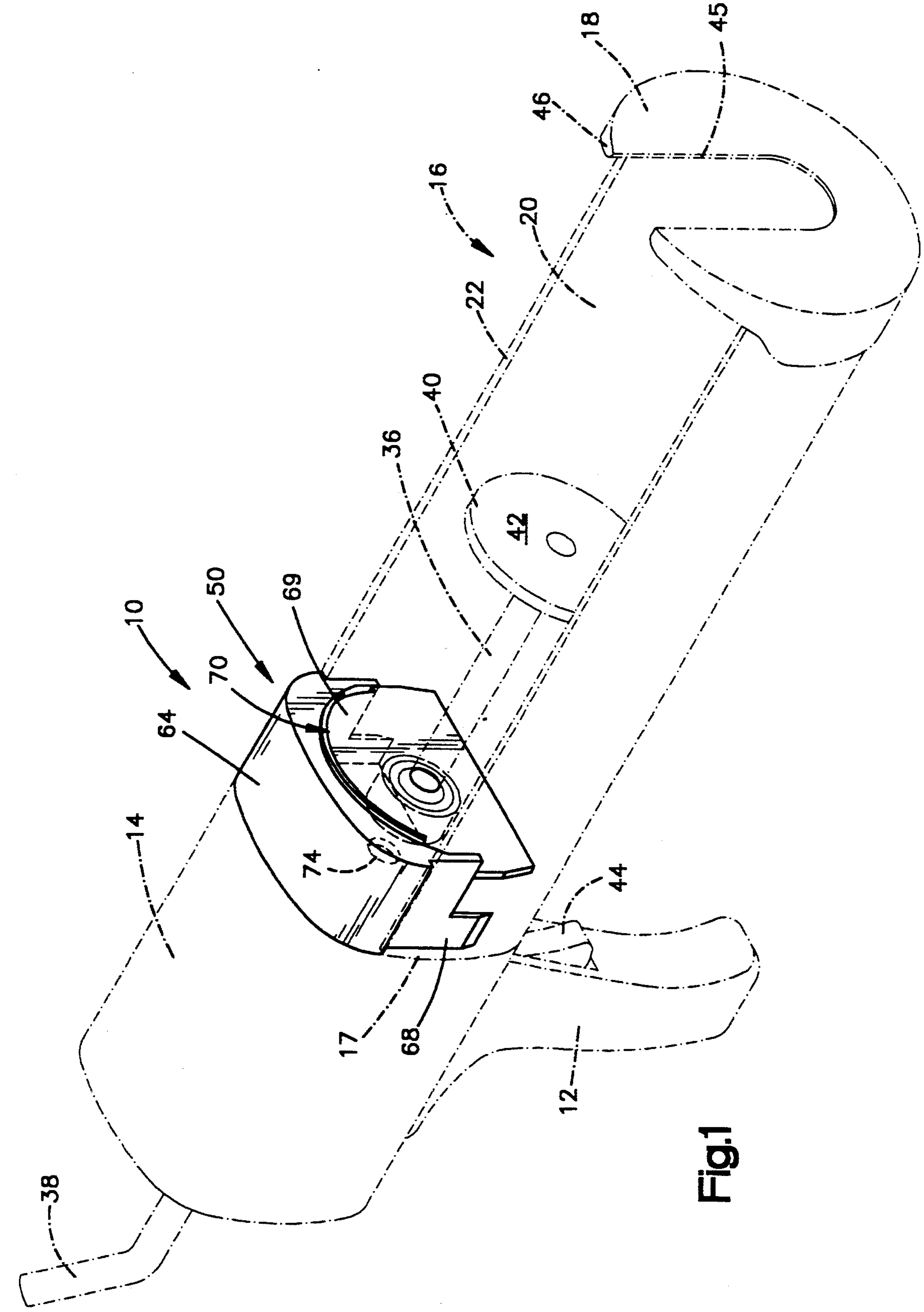
FIG. 1 is a perspective view of the cartridge biasing assembly constructed according to the principles of the present invention, shown mounted to a caulking gun (illustrated in phantom)
Figure 2:
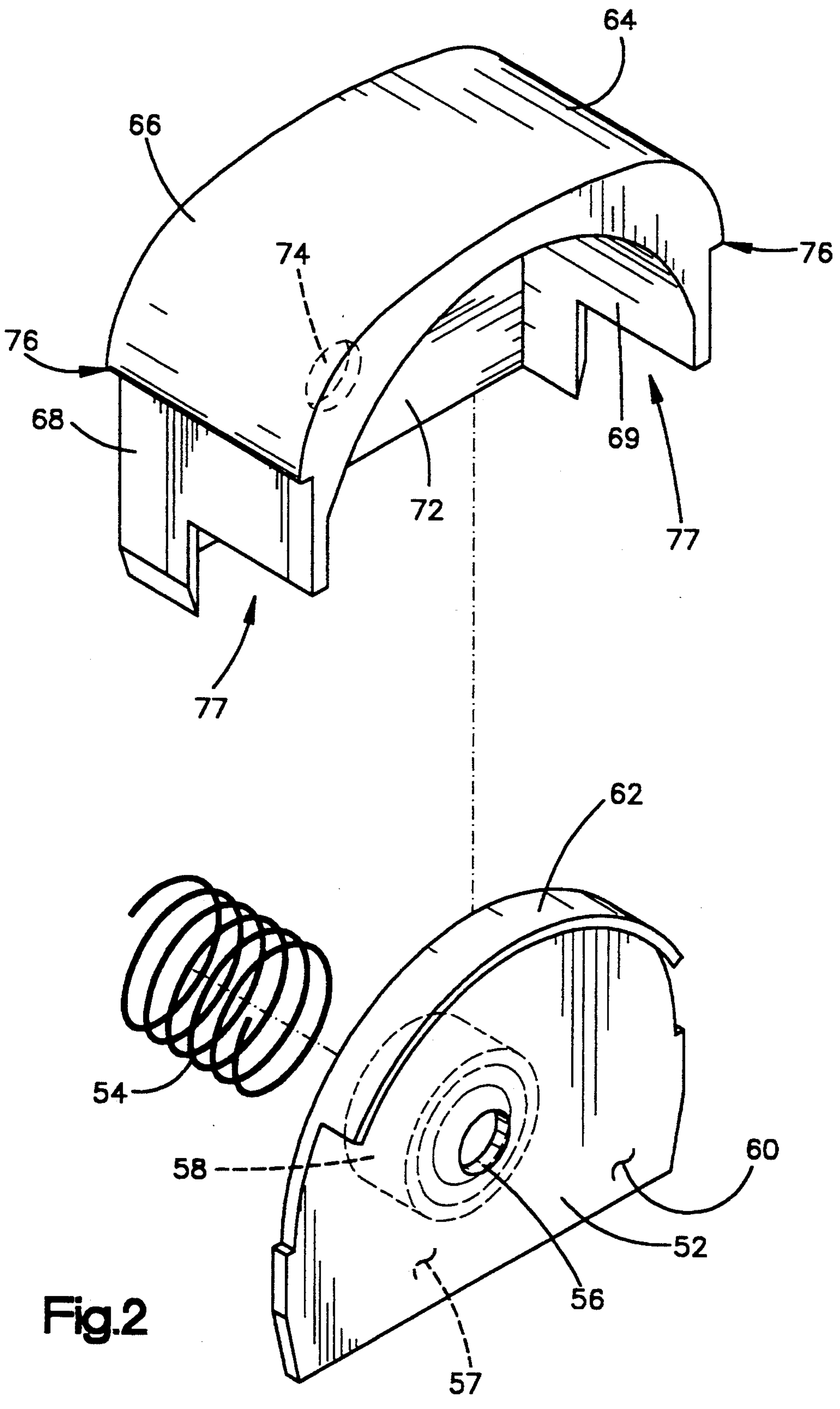
FIG. 2 is a perspective illustration of the unassembled cartridge biasing assembly of FIG. 1.
Figure 3:
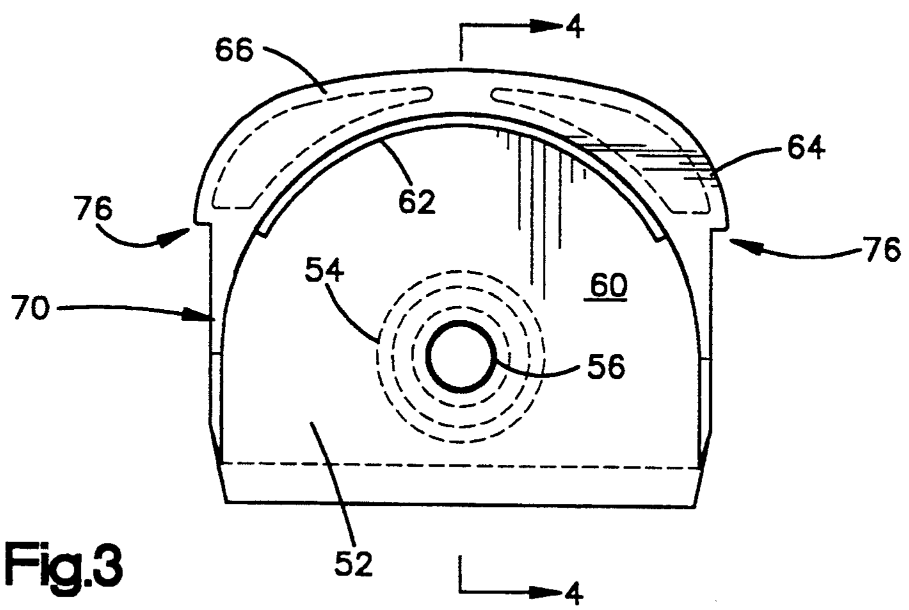
FIG. 3 is a front end view of the cartridge biasing assembly.
Figure 4:
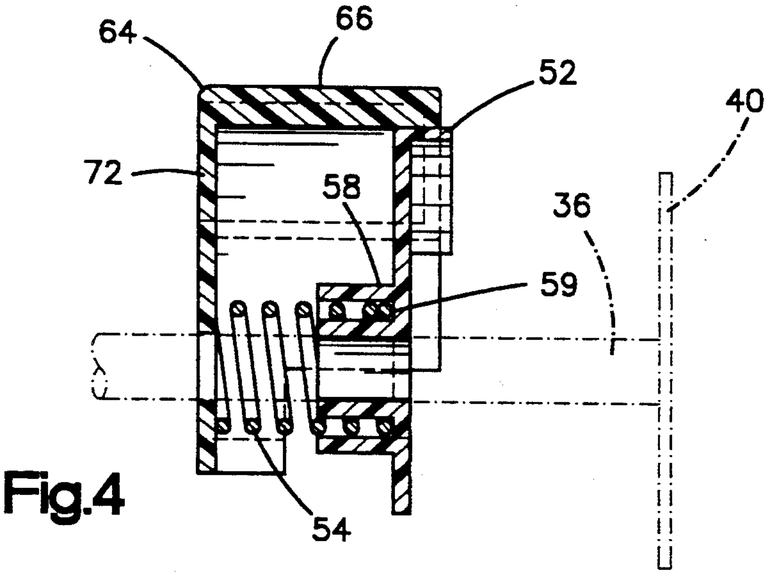
FIG. 4 is a cross-sectional side view of the cartridge biasing assembly taken substantially along the plane described by the lines 4—4 of FIG. 3.

Referring to the drawings, and initially to FIG. 1, a dispensing device constructed according to the present invention is indicated generally at 10. Preferably, the dispensing device comprises a caulking gun having a pistol-grip handle 12, formed integrally with an upper handle portion 14. A frame comprising a hemispherical cylinder, indicated generally at 16, extends forwardly from a butt cup 17 on the upper handle portion 14 and terminates in a front yoke 18. As illustrated, the hemispherical cylinder is formed from one piece with an opening along the top and has an uninterrupted, U-shaped sidewall in cross section; however the cylinder could also be formed in more than one piece and can have other openings or apertures along its length as should be known to those in the art. A cartridge cavity 20 is defined by side walls 22 of hemispherical cylinder 16, front yoke 18 and butt cup 17 on the upper handle portion 14. The dispensing device is preferably formed (e.g., molded) from rigid, inexpensive, shock and abrasive-resistant material, such as engineered composite materials.

The dispensing device 10 further includes a rigid plunger shank or shaft 36 which passes horizontally through the upper portion of the handle 14. The plunger shaft has at the rear end an angled bend 38, and at the forward end a thrust disc or piston 40 having a flat front surface 42 for contacting the piston in the caulking cartridge and moving the piston forwardly.

A trigger 44 in handle 12 is associated with urging means within the handle for urging plunger shaft 36 forwardly within hemispherical cylinder 16. The means for urging the shaft can comprise a conventional spring-biased washer, the bottom of which is driven off-center against shaft 36, or can comprise other means as are known in the art, for example as shown in Chang, U.S. Pat. No. 5,181,636, Davis, Jr., U.S. Pat. No. 4,376,498, or Anderson, et al., U.S. Pat. No. 4,081,112. In other words, the present invention is not limited to any particular means for urging the piston shaft 36 in a forward direction and is intended to encompass all such means, including manual, air, $CO_2$, electric, etc. Finally, a release trigger (not shown) is also included in the handle to relieve the pressure on the cartridge piston and allow grasping of bend 38 on shaft 36 and manual pulling of the plunger rearwardly within the dispensing device to remove a spent cartridge and reload a fresh cartridge.

The cartridge cavity 20 is designed to receive a disposable cartridge (not shown) containing a viscous product. A variety of disposable cartridges can be used in the present invention, for example, a disposable caulking cartridge manufactured by the Glidden Company under the trade name Macco adhesives. The cartridges preferably contain about 10 fluid ounces of caulking compound, however other size cartridges, such as 30 fluid ounces, can also be used with the present invention. Moreover, although this invention is primarily directed toward cartridges containing caulking compound, the dispensing device can also be used to dispense other viscous materials, such as butyl rubber, silicone, latex, mortar seal, roof cement, or other adhesives or sealants.

A typical caulking cartridge includes an annular wall defining a bore, a cap having a nozzle attached to one end of the tube, and a caulking cartridge piston located within the annular wall at the other end of the cartridge. The cap, annular wall, and piston define a cavity for the caulking compound. The caulking cartridge piston is adapted to slide within the bore formed by the walls of the caulking cartridge and apply pressure to the caulking product to dispense the product through the nozzle in the cartridge. The caulking cartridge is designed to be received within the cavity 20 of the hemispherical cylinder 16 and have the nozzle extend outwardly through U-shaped slot 45 formed in front yoke 18. Yoke 18 includes a rearwardly-extending flange 46 extending around the periphery of the yoke which is designed to normally prevent vertical movement of the front end of the caulking cartridge when the cartridge is located within the cavity 20. However, as described previously, under certain circumstances, the front end of the cartridge can become dislodged from the yoke 18 and can actually bear against flange 34.

A cartridge biasing assembly, indicated generally at 50, is included within the dispensing device 10 to urge the cartridge forwardly within the hemispherical cylinder 16 and prevent the cartridge from becoming misaligned within the dispensing device. Referring now to FIGS. 1–5, the cartridge biasing assembly 50 includes a biasing plate 52 which is spring biased forwardly within the hemispherical cylinder 16 by a spring 54. Spring 54 is received around plunger shaft 36 and is interposed between the rear wall 30 of the butt cup 17 and the biasing plate 52. Plunger shaft 36 extends through an opening 56 formed centrally within the biasing plate 52 for relative movement therein.

To locate the biasing plate 52 around plunger shaft 36, the piston shaft 36 is inserted through the coiled spring 54 and the aperture 56 in the biasing plate 52. Thereafter, the plunger piston 40 is attached (e.g., screwed) to the distal end of the plunger shaft 36. The rear surface 57 of the biasing plate 52 can include a rearwardly-extending sleeve 58 which surrounds a short length of plunger shaft 36 to provide stability for the biasing plate 52, as well as to provide a counterbore 59 which receives spring 54 (see, e.g., FIGS. 4, 5).

When biasing plate 52 and spring 54 are assembled within the dispensing device 10 as described above and a cartridge is inserted within the cartridge cavity 20, the front planar surface 60 of biasing plate 52 engages the end of the annular outer wall of the cartridge. The cartridge is in part located centrally on biasing plate 52 and prevented from becoming unseated (i.e., raised up) from the biasing plate by a forwardly-extending flange 62 formed along the upper periphery of the biasing plate. The cartridge is biased forwardly by the biasing plate 52 against the front yoke 18 of the hemispherical cylinder 16. This forward biasing of the cartridge helps prevent the front end of the cartridge from becoming dislodged from the yoke 18 during the dispensing process and keeps the front end of the cartridge square against the yoke 18. The piston plunger 36, however, is free to move within aperture 56 relative to biasing plate 52 such that plunger piston 40 urges the cartridge piston forwardly in a normal manner within the cartridge.

The cartridge biasing assembly 50 preferably also includes an outer shroud 64 which extends across and interconnects the side walls 22 of the hemispherical cylinder 16, and at least partially encloses the biasing plate 52 and the spring 54. The shroud 64 includes an upper housing portion 66; two downwardly-extending side walls 68, 69 which interfit snugly within the hemispherical cylinder 22; and a rear wall 72 which is located adjacent the butt cup 17. The upper housing portion 66 and side walls 68, 69 define an entrance opening, indicated generally at 70, of the shroud. The rear wall 72 of the shroud 64 includes an aperture 74 designed to receive the plunger shaft 36 of the plunger.

If the shroud is to be used with the cartridge biasing assembly, the shroud 64, biasing plate 52 and spring 54 are initially preassembled and located within the hemispherical cylinder 16 such that the plunger shaft 36 extends through aperture 74 in shroud 64, through the coiled spring, and through aperture 56 in biasing plate 52. The plunger piston 40 is then attached (e.g., screwed) onto the distal end of the plunger shaft 36. Thus, neither the shroud 64 nor the biasing plate 52 and spring 54 require any additional mechanical fasteners, such as rivets, bolts, etc., to fasten these components to the dispensing device 10. Further, these devices can be easily retrofitted onto an existing dispensing device, or removed, in a simple and easy manner.

The spring biasing assembly 50 will tend to be retained toward the rear end of the hemispherical cylinder 16 by virtue of the attachment to plunger shaft 36 and the contact with the cartridge when the cartridge is located within the dispensing device. However, the shroud 64 can include an outwardly-protruding shoulder, indicated generally at 76 (FIGS. 2, 3), formed along the length of the shroud between the walls 68, 69 and the upper housing portion 66, which fits over and abuts the walls 22 of the hemispherical cylinder. As illustrated, block-shaped portions 77 have been removed from walls 68, 69 of the shroud to fit over support structure in the cylinder 22. When the shroud 64 is assembled within the dispensing device, the walls 68, 69 of the shroud provide a smooth transition from the cartridge side walls 22 into the opening of the shroud for insertion of the cartridge. Although the shroud 64 is shown formed separately from the butt cup 17 of the handle, it is also anticipated that the shroud could be formed in a single piece with the handle.

Although the method of operation of the dispensing device should be apparent from the above description, a short description is nonetheless provided. After the biasing plate 52 and spring 54 (and shroud 64 if desired) are assembled on the plunger shaft 36, the plunger shaft 36 is pulled rearwardly within the dispensing device to the extent necessary to locate a caulking cartridge within chamber 20. The plunger piston 40 will typically be drawn rearwardly into engagement with biasing plate 52 to move biasing plate 52 rearwardly within shroud 64. A cartridge is then inserted into cavity 20, rear end first, with the walls of shroud 64 directing the cartridge into the entrance opening 70 of the shroud. The user typically will have to push the cartridge rearwardly within the hemispherical cylinder 22 such that the front end of the cartridge clears the flange 34 on front yoke 18 and the cartridge nozzle can be dropped down into U-shaped opening 45 in yoke 18.

Figure 5:
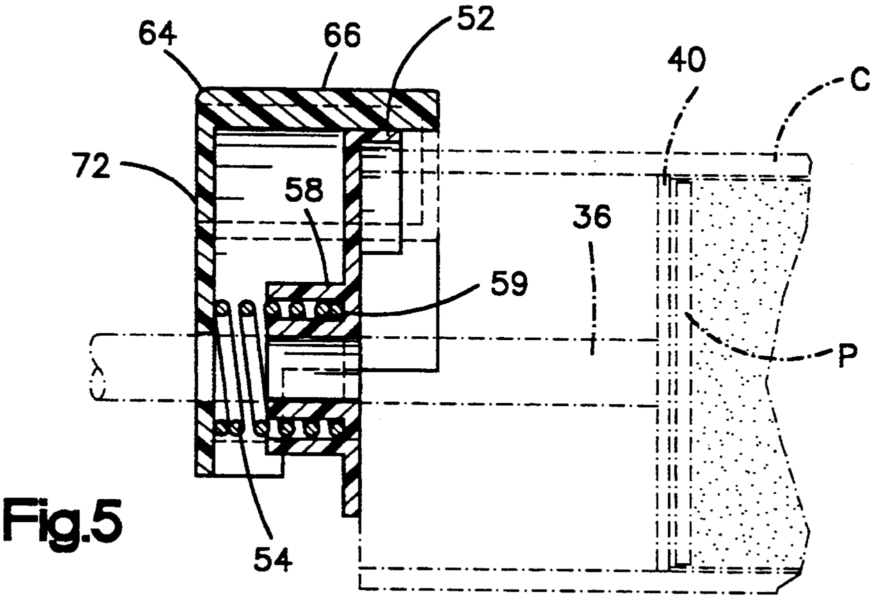
FIG. 5 is a cross-sectional side view of the cartridge biasing assembly similar to FIG. 4, but showing a cartridge inserted within the dispensing device.

At this point, the cartridge is aligned centrally within the cavity 20. The biasing plate 52 provides a forward bias on the cartridge such that the cartridge is urged square against the front yoke 18. Further, forwardly-extending flange 62 prevents the rear of the cartridge from raising up within the hemispherical cylinder. As illustrated in FIG. 5, trigger 44 on handle 22 can be depressed to move plunger shaft 36 and plunger piston 40 forward to engage the piston "P" within the cartridge "C".

When the dispensing is complete, the plunger 36 can be moved in a rearward direction when the release trigger is unlocked by grasping and pulling rearwardly on the angled end of the plunger, and the cartridge can be removed and replaced as necessary.

Accordingly, as described above, the present invention provides a novel and unique dispensing device which properly supports a cartridge. The dispensing device not only prevents the end of the cartridge from raising up within the device, but also maintains a constant forward pressure against the cartridge such that misalignment of the cartridge within the dispenser is prevented.

Although the invention has been shown and described with respect to a certain preferred embodiment, it is obvious that equivalent alterations and modification will occur to others skilled in the art upon their reading and understanding of the specification. The present invention includes all such equivalent alterations and modifications and is limited only by the scope of the following claims.

What is claimed is:

1. A dispensing device, comprising:

a frame configured to receive and support a cartridge containing a viscous product, said frame including a front yoke configured and positioned to receive and align a nozzle at one end of the cartridge, and sidewalls defining an aperture configured and positioned to receive the cartridge and support a body of the cartridge, a cartridge biasing assembly integral with said frame configured and positioned to bias the cartridge toward the front yoke of said frame, said cartridge biasing plate including a biasing plate configured and positioned to engage another end of said cartridge and urge the other end of the cartridge forwardly toward the front yoke of the frame, said biasing plate including a flange extending outwardly around at least a portion of the periphery of said plate, said flange being configured and positioned to surround a portion of the rear end of the cartridge and prevent the cartridge end from raising up in the frame, a plunger having a plunger shaft and plunger plate for dispensing the viscous product from the cartridge, and a drive assembly including a handle and a trigger for advancing said plunger.

2. The dispensing device as in claim 1, wherein said cartridge includes a cartridge piston received within said body for urging the viscous product through the nozzle, and said plunger plate is configured and positioned to contact the cartridge piston and move the piston within the cartridge for dispensing the viscous product.

3. The dispensing device as in claim 1, wherein said front yoke includes a slot configured and positioned to receive the cartridge nozzle and an inwardly extending flange configured and positioned to at least partially surround the forward end of the cartridge.

4. The dispensing device as in claim 1, wherein said cartridge biasing assembly further includes a spring normally biasing said biasing plate forwardly toward the front plate of the frame.

5. The dispensing device as in claim 4, wherein said biasing plate includes an aperture receiving the plunger shaft of said plunger and said spring surrounds said plunger shaft of said plunger and is interposed between said biasing plate and a rear wall of said frame.

6. The dispensing device as in claim 5, wherein the cartridge biasing assembly further includes a shroud extending a predetermined distance from said rear frame wall toward said front frame plate, said shroud defining an opening configured and positioned to receive a portion of said cartridge with said shroud at least partially enclosing said biasing plate and said spring.

7. The dispensing device as in claim 6, wherein said shroud is formed separately from said frame.

8. An attachment for a dispensing device which is configured to receive a cartridge containing a viscous product within a frame and to dispense viscous product from the cartridge, said attachment comprising:

a cartridge biasing assembly configured and positioned to be mounted integrally with said frame, said cartridge biasing assembly having structure which can engage the cartridge and bias the cartridge in a forward direction against a front end of the frame, said biasing assembly including a biasing plate configured and positioned to engage the cartridge end remote from the front end of the frame and including a flange extending outwardly around at least a portion of the end remote from the front end of the frame and prevent the cartridge remote end from raising up in the frame.

9. The attachment as in claim 8 wherein said cartridge biasing assembly includes a shroud defining an opening configured and positioned to receive a portion of said cartridge with said shroud at least partially enclosing said biasing plate and said spring.

10. The attachment as in claim 8, wherein said cartridge biasing assembly includes a spring positioned to be interposed between a rear wall of the dispensing device and the bias plate to urge the bias plate forwardly within the dispensing device.

11. The attachment as in claim 10, further including a shroud at least partially enclosing said biasing plate and said spring.

* * * * *